United States Patent [19]

Yates

[11] 4,326,047

[45] Apr. 20, 1982

[54] PROCESS FOR REACTING ALKYLENE OXIDES WITH HYDROXYL-CONTAINING INITIATOR COMPOUNDS

[75] Inventor: Ronald L. Yates, Midland, Mich.

[73] Assignee: The Dow Chemical Company, Midland, Mich.

[21] Appl. No.: 204,688

[22] Filed: Nov. 6, 1980

[51] Int. Cl.³ .................... C08G 65/26; C08G 65/28
[52] U.S. Cl. .................. 525/507; 526/213; 528/90; 528/92; 528/413; 536/111; 536/120; 568/23; 568/33; 568/46; 568/48; 568/609; 568/620
[58] Field of Search ............ 260/9, 17.4 GC, 17.4 ST, 260/17.4 SG; 536/111, 120; 525/507; 526/213; 528/90, 92, 413; 568/23, 33, 48, 46, 609, 620

[56] References Cited

U.S. PATENT DOCUMENTS

| | | |
|---|---|---|
| 2,341,565 | 2/1944 | Lyman et al. ............... 252/48 |
| 2,923,690 | 2/1960 | Bedoit ......................... 260/2 |
| 2,934,505 | 4/1960 | Gurgiolo ..................... 260/2 |
| 3,031,439 | 4/1962 | Bailey, Jr. ................ 260/88.3 |
| 3,285,968 | 11/1966 | Bradley ..................... 260/615 |
| 3,755,197 | 8/1973 | Hsieh ...................... 252/431 C |
| 4,282,387 | 8/1981 | Olstowski et al. ........... 568/618 |

OTHER PUBLICATIONS

J. of Polymer Science, vol. 1, pp. 2015-2019, 1966.

Primary Examiner—Earl A. Nielsen
Attorney, Agent, or Firm—J. G. Carter

[57] ABSTRACT

Polyether hydroxyl-containing compounds are prepared by reacting a monoepoxy-containing compound such as propylene oxide with a compound containing one or more OH and/or SH groups such as a low molecular weight adduct of glycerine and propylene oxide in the presence of a solid calcium naphthenate catalyst. The solid form of the catalyst is more efficient than the liquid form.

3 Claims, No Drawings

PROCESS FOR REACTING ALKYLENE OXIDES WITH HYDROXYL-CONTAINING INITIATOR COMPOUNDS

BACKGROUND OF THE INVENTION

Polyols for use in preparing polyurethanes are usually prepared by reacting an initiator compound having a plurality of active hydrogen atoms with an alkylene oxide in the presence of basic catalysts such as tertiary amines, sodium and potassium hydroxides and sodium wherein a sodium derivative, the alcoholate or alkoxide, is formed in situ. However, these catalysts must usually be removed by filtration and/or neutralization or other catalyst removal methods prior to use, particularly when prepolymers are to be prepared from such polyols.

Olstowski and Nafziger, in a co-pending application Ser. No. 107,242 filed Dec. 2, 1979, now U.S. Pat. No. 4,282,387, issued Aug. 4, 1981, disclose preparing polyols by reacting alkylene oxides with hydroxylinitiator compounds in the presence of calcium, strontium and barium salts or organic acids as catalysts which do not need to be removed when the resultant product is to be employed in the preparation of polyurethanes.

It has now been discovered that when calcium naphthenate is employed in a solid form as the catalyst in the aforementioned reaction that the reactivity rate between the epoxy-containing compound and the hydroxyl-containing initiator compound is increased as compared to the calcium naphthenate in liquid form.

SUMMARY OF THE INVENTION

The present invention pertains to an improvement in a process for reacting one or more monoepoxy-containing compounds with one or more initiator compounds one or more active hydrogen atoms in the presence of calcium naphthenate as a catalyst wherein said improvement comprises employing said catalyst in the form of a solid.

DETAILED DESCRIPTION OF THE INVENTION

Suitable initiator compounds include, for example, alcohols, glycols, low molecular weight polyols, glycerine, trimethylol propane, pentaerythritol, glucosides, sugars, starches, phenols, bisphenols, phenol-aldehyde novolac resins, as well as the corresponding thiol-containing compounds, mixtures thereof and the like.

Particularly suitable glycols include, for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,6-pentylene glycol, neopentyl glycol, the various hexane diols, mixtures thereof and the like.

Particularly suitable phenols include phenol, resorcinol, catechol, hydroquinone, mixtures thereof and the like.

Particularly suitable bisphenols include those represented by the formula

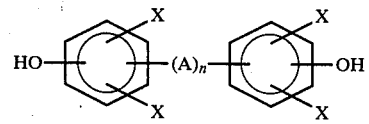

wherein A is a divalent hydrocarbon group having from 1 to about 8 carbon atoms, —S—, —S—S—, —O—,

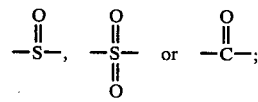

each X is independently hydrogen, chlorine or bromine and n has a value of zero or 1.

Particularly suitable low molecular weight polyglycols include the reaction product of an ether-free initiator compound having from 2 to about 8 hydroxyl groups and a mono-epoxy compound in quantities sufficient to provide from about 1 to about 4 moles of mono-epoxy compound for each hydroxyl group contained in the initiator compound.

Suitable mono-epoxy containing compounds include, for example, the alkylene oxides and halogenated and aryl substituted derivatives thereof, glycidyl ethers having from about 3 to about 20 carbon atoms, mixtures thereof and the like.

Particularly suitable alkylene oxides include, for example, ethylene oxide, propylene oxide, 1,2-butylene oxide, 2,3-butylene oxide, styrene oxide, epichlorohydrin, epibromohydrin, mixtures thereof and the like.

Particularly suitable glycidyl ethers include, for example, allyl glycidyl ether, phenyl glycidyl ether, butyl glycidyl ether, mixtures thereof and the like.

The solid catalysts employed in the present invention can be prepared by precipitation of commercially available liquid calcium carboxylate salts with a suitable polar organic solvent such as alcohols, ketones, mixtures thereof and the like such as, for example, isopropyl alcohol or acetone.

The liquid calcium carboxylate salts are commercially available from such sources as Pfaltz and Bauer, Inc., Cabot Corp., Shepard Chemical Industries, Inc., H & N Chemical Co., Witco Chemical Corp. and Mooney Chemicals, Inc.

The products prepared by the process of the present invention can be employed in such applications as polyols for preparing polyurethane foams, hydraulic fluids and the like.

The following examples are illustrative of the present invention but are not to be construed as to limiting the scope thereof in any manner.

EXAMPLE 1

To a 50 ml erlenmeyer flask was added 3 grams of a calcium based liquid carboxylate comprising essentially a calcium salt of naphthenic acid (Calcium Neo-Nap; commercially available from Mooney Chemicals, Inc.) containing 6 wt. percent calcium. To this was added 50 ml of acetone. A brown gummy precipitate formed immediately. In some cases, depending upon the batch of Calcium Neo-Nap used, a white powdery precipitate was obtained.

The acetone was decanted and residual volatiles were removed under a stream of nitrogen or air. The solid mass was then broken up with a spatula and completely dried in a vacuum oven heated to 50°-60° C. (pressure <1 mm Hg). The dry material was then ground to a powder yielding 1.68 grams of a white to slightly brown solid. The material can be stored in air at ambient temperature.

Solid calcium naphthenate can also be obtained in a similar manner as outlined above by addition of the liquid calcium naphthenate to a vessel containing acetone or another polar organic solvent, e.g., isopropanol.

EXAMPLE 2

To a dry 3 gallon, steam heated, stirred pressure reactor equipped with a recycle system was added 264.12 grams of a 255 MW adduct of glycerine and propylene oxide, and 15 grams (0.5 percent by weight based on expected weight of the final product) of solid calcium naphthenate catalyst prepared as in Example 1.

The reactor was then purged with nitrogen several times before use. The reactor contents were heated to a temperature of 139° C. and propylene oxide was fed into the stirred reactor with the reactor pressure being maintained between 60 psig and 80 psig by controlling the propylene oxide feed rate. After about 9 hours, a total of 3000 grams of propylene oxide had been fed into the reactor.

A total of 3000 grams of a light yellow fluid product was drained from the reactor. A wet method hydroxyl analysis of this product showed a hydroxyl content equivalent to an average molecular weight value of 2898. The unsaturation content, as determined by the Mercuric Acetate Method, was 0.015 meg/gram.

EXAMPLE 3

As in Example 2 a kettle was charged with 262.18 grams of the 255 MW glycerine-propylene oxide adduct and 30 grams of solid calcium naphthenate catalyst (1%). A total of 3013 grams of propylene oxide was added over a 9 hour period at a kettle temperature of 139° C. A total of 3226 grams of product was obtained. Analysis of the product gave an average molecular weight of 2538 (based on % OH) and an unsaturation content of 0.020 meq/gram.

EXAMPLE 4

As in Example 2, propylene oxide was added to a heated kettle charged with 298.75 grams of the 255 MW glycerine-propylene oxide adduct and 7.16 grams of solid calcium naphthenate catalyst (0.25%). A total of 2840 grams of propylene oxide was added over 14 hrs. A total of 2835.10 grams of product was recovered from the reactor. Analysis of the product (based on % OH) gave an average molecular weight of 2772 and an unsaturation content of 0.020 meq/gram.

COMPARATIVE EXPERIMENT A

To a dry 3 gallon steam heated, stirred pressure reactor was added 251.9 grams of a 255 MW adduct of glycerine and propylene oxide, and 30 grams (1 percent by weight based on expected 3000 gram weight of the final product) of liquid calcium naphthenate catalyst.

The reactor was then purged with nitrogen several times before use. The reactor contents were heated to a temperature of 139° C. and propylene oxide was fed into the stirred reactor with the reactor pressure being maintained between 60 psig and 80 psig by controlling the propylene oxide feed rate. After 29 hours, a total of 2750 grams of propylene oxide had been fed into the reactor. The rate of propylene oxide addition is therefore approximately 95 grams/hr. A total of 2875.4 grams of a light yellow fluid product was drained from the reactor. A wet method hydroxyl analysis of this product showed a hydroxyl content equivalent to an average molecular weight value of 2463. The unsaturation content was 0.02 meq/gram.

A summary of the results obtained in Examples 2-4 and Comparative Experiment A is given in the following Table I.

TABLE I

| EXAMPLE OR COMPARATIVE EXPERIMENT NUMBER | CATALYST | % CATALYST[1] | RUN TIME (hr.) | APPARENT[2] PO COMSUMPTION (gm/hr) | UNSATURATION (meq/gram) |
|---|---|---|---|---|---|
| A | Liquid | 1.00 | 29 | 95 | 0.020 |
| 3 | Solid | 1.00 | 9 | 334 | 0.020 |
| 2 | Solid | 0.50 | 9 | 334 | 0.015 |
| 4 | Solid | 0.25 | 14 | 203 | 0.020 |

[1]% by weight - based on the weight of final product.

[2]Apparent PO Consumption = $\frac{\text{Total PO Added to Reactor (gram)}}{\text{Run Time (Hr.)}}$

EXAMPLE 5

In a manner similar to Example 2, a mixture of 436.6 grams of a 549 equivalent weight adduct of glycerine and propylene oxide and 15 grams of solid calcium naphthenate catalyst were added to a 3 gallon stirred pressure reactor.

The reactor was heated at 139° C. and propylene oxide was added to the stirred reactor. After about 9 hours of run time, a total of 2270 grams of propylene oxide had been added.

A total of 2636.2 grams of a light yellow fluid product was recovered from the reactor.

A wet method hydroxyl analysis of this product showed a hydroxyl content equivalent to an average molecular weight of 7083. The unsaturation content was determined to be 0.02 meq/gram.

EXAMPLE 6

A series of sealed tube kinetic runs were performed in order to determine the relative catalytic activities of solid and liquid calcium naphthenate. The amount of catalyst used in all runs was such that the Ca content was the same for both the solid and liquid catalysts. Three different initiators were used. Initiator A was the 255 MW triol employed in Example 2. Initiator B was a 400 MW polyoxypropylene glycol. Initiator C was the methyl ether of tripropylene glycol.

Each of the kinetic runs were performed in the following manner: glass ampoules were charged with 10.37 grams of propylene oxide, 0.006 mol. of initiator, and 0.12 gram of liquid calcium naphthenate or 0.052 gram of solid calcium naphthenate. The % Ca was the same in all runs regardless of which catalyst (liquid or solid) was used, i.e. the Ca content in 0.12 gram of liquid calcium naphthenate (% Ca=6%) is equivalent to that in 0.052 gram of solid calcium naphthenate (% Ca=13.7%), i.e., 0.007 grams Ca.

The ampoules were then sealed and heated at 135° C. in a rocking steam bomb. Sample ampoules were removed from the bomb at regular intervals. Unreacted propylene oxide was evaporated under vacuum and the weight loss of the sample gave the weight (grams) of unreacted propylene oxide. The % propylene oxide conversion was then calculated using the expression:

$$\% \text{ Propylene Oxide Conversion} = \frac{(PO)_o - (PO)_T}{(PO)_o} \times 100$$

where $(PO)_o$ is the initial weight (grams) of propylene oxide and $(PO)_T$ is the weight (grams) of unreacted propylene oxide at time T.

The results are given in the following Table II.

TABLE II

| RUN NO. | CATALYST TYPE | INITIATOR | % PROPYLENE OXIDE CONVERSION AFTER: | | | | | | | |
|---|---|---|---|---|---|---|---|---|---|---|
| | | | 1 Hr | 2 Hrs | 3 Hrs | 4 Hrs | 5 Hrs | 6 Hrs | 7 Hrs | 8 Hrs |
| A[1] | Solid | A | 86.1 | 99.8 | 100 | — | — | — | — | — |
| B[2] | Liquid | A | 4.7 | 11.5 | 77 | 92 | 99[3] | — | 100[4] | — |
| C[1] | Solid | B | 72.1 | 93.9 | 99.7 | — | — | — | — | — |
| D[2] | Liquid | B | 27.8 | 75.1 | — | — | 94.7 | — | — | 98.7 |
| E[1] | Solid | C | 35.9 | 85.6 | 90.9 | 98.4 | — | 99.7 | — | — |
| F[2] | Liquid | C | 21.1 | 50.1 | 79.5 | — | — | 94.1 | — | — |

[1] example of present invention.
[2] comparative experiment.
[3] after 5.5 hours.
[4] after 7.5 hours.

As can be readily ascertained from the data in Table II, the solid calcium naphthenate catalyst is much more active than the liquid calcium naphthenate catalyst.

EXAMPLE 7

An ampoule was charged with 10.37 grams of propylene oxide, 0.412 gram of an initiator which was an adduct of methanol and propylene oxide (MW=206), and 0.05 grams of solid calcium naphthenate catalyst. The ampoule was heated in a rocking steam bomb at 140° C. for 20 hrs. The viscous product was removed and any unreacted propylene oxide was removed under vacuum. The propylene oxide conversion was found to be 100%. A wet method hydroxyl analysis of this product showed an average molecular weight equivalent to 6733. The unsaturation content was <0.02 meq/gm.

EXAMPLE 8

An ampoule was charged with 10.37 grams of propylene oxide, 0.1 gram of a polyoxypropylene glycol having a molecular weight of 400 and 0.05 gram of solid calcium naphthenate catalyst. The reaction was carried out as in Example 7. The average molecular weight of this product was found to be 10,000. The unsaturation content was 0.03 meq/gm.

I claim:

1. In a process for reacting one or more monoepoxy-containing compounds with a compound or mixture of compounds having one or more OH and/or SH groups in the presence of calcium naphthenate as a catalyst, the improvement which comprises employing said catalyst in solid form.

2. The process of claim 1 wherein said monoepoxy-containing compound is an alkylene oxide having from two to about four carbon atoms or a mixture thereof and said compound or mixture of compounds containing one or more OH and/or SH groups containing only OH groups.

3. The process of claim 2 wherein said monoepoxy-containing compound is propylene oxide and said compound containing OH groups contains from one to about three such groups.

* * * * *

UNITED STATES PATENT AND TRADEMARK OFFICE
CERTIFICATE OF CORRECTION

PATENT NO. : 4,326,047
DATED : April 20, 1982
INVENTOR(S) : Ronald L. Yates

It is certified that error appears in the above—identified patent and that said Letters Patent is hereby corrected as shown below:

Column 1, line 21, "Dec. 2, 1979," should read --Dec. 26, 1979--; line 26 "or" should read --of--; line 41, add the word --containing-- before "one".
Column 3, line 46, "meg/gram" should read --meq/gram--.
Column 4, Table I in the heading, "COMSUMPTION" should read --CONSUMPTION--.
Column 6, line 41 "containing" should read --contains--.

Signed and Sealed this

Twenty-sixth Day of October 1982

[SEAL]

Attest:

Attesting Officer

GERALD J. MOSSINGHOFF
Commissioner of Patents and Trademarks